(12) United States Patent
Umemoto et al.

(10) Patent No.: US 8,711,541 B2
(45) Date of Patent: Apr. 29, 2014

(54) LIGHTNING-PROTECTIVE EXPLOSION-PREVENTIVE FASTENER

(75) Inventors: Soichiro Umemoto, Tokyo (JP); Hideo Yamakoshi, Tokyo (JP); Atsuhiro Iyomasa, Tokyo (JP); Toru Hashigami, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 262 days.

(21) Appl. No.: 13/432,649

(22) Filed: Mar. 28, 2012

(65) Prior Publication Data

US 2012/0250209 A1   Oct. 4, 2012

(30) Foreign Application Priority Data

Mar. 30, 2011  (JP) .................................. 2011-75143

(51) Int. Cl.
*H05F 3/00*   (2006.01)
(52) U.S. Cl.
USPC .......................................................... 361/218
(58) Field of Classification Search
CPC ................................ B64D 45/02; B64D 45/00
USPC .......................................................... 361/218
See application file for complete search history.

(56) References Cited

U.S. PATENT DOCUMENTS 5,820,225 A * 10/1998 Ferriss et al. ............ 301/37.371
2010/0277849 A1 * 11/2010 Morrill et al. .................. 361/218

FOREIGN PATENT DOCUMENTS

DE           4027443 A1 *  4/1991   ............. F16B 39/26
JP      2009-227166 A      10/2009

* cited by examiner

*Primary Examiner* — Jared Fureman
*Assistant Examiner* — Kevin J Comber
(74) *Attorney, Agent, or Firm* — Pearne & Gordon LLP

(57) ABSTRACT

In an insulating cover 50A according to the present invention, a dimension of each of an outer-circumferential-side cylindrical part 50c and an inner-circumferential-side cylindrical part 50b fitting in step parts 40 and 41 in an axial direction of a fastener body 25 is set large with respect to a tip covering part 50a covering a tip surface 26a of a fastening member 26. As a result, on an outer circumferential side and an inner circumferential side of the fastening member 26, a distance from a member 22 is sufficiently ensured by the cylindrical part 50b and 50c. The tip covering part 50a is thinner than the cylindrical part 50B and 50c. Therefore, when the fastener body 25 and the fastening member 26 are fastened together, the amount of deformation of the tip covering part 50a in a thickness direction can be made small.

7 Claims, 4 Drawing Sheets

LIGHTNING-PROTECTIVE EXPLOSION-PREVENTIVE FASTENER

BACKGROUND OF THE INVENTION

1. Field of the Invention

The present invention relates to a lightning-protective fastener to prevent explosion for use in a portion having a possibility of being filled with flammable fuel vapor of a fuel tank or the like placed in an airframe of an aircraft, in particular, a wing or a fuselage.

2. Description of the Related Art

A wing configuring an airframe of an aircraft generally has a hollow structure, and a wing-surface panel forming a wing surface is fixed to a structural member inside of a wing with fastener members (stoppers).

Here, a fastener member has a pin-shaped fastener body inserted from outside of the wing into through holes formed on both of the wing-surface panel and the structural member inside of the wing and, with its tip fixed from inside of the wing with a fixing metal part, thereby fastening the wing-surface panel and the structural member together.

In addition, also in the inside of the wing and a fuselage, structural members other than the wing-surface panel and members for fixing equipment are fastened and fixed with fastener members.

Here, in a fastener member, the pin-shaped fastener body is inserted so as to pass through both through holes formed in both members to be fixed together and has its tip fixed to a fastening member (a collar), thereby fastening both of the members together.

Note that the number of wing-surface panels or members to be fixed is not restricted to two.

Meanwhile, in an aircraft, it is required to fully assure lightning-protective measures for preventing explosion. If lightning hits the aircraft and a large current flows through the wing-surface panel or a structural member of a main wing or the like, part or an entirety in some cases of the current flows through fastening parts with the fastener body and the fastening member described above. If the current value exceeds a limit value of a passage allowable current at each fastening part, an electric discharge called an electric arc (or a thermal spark) occurs (hereinafter referred in the specification as an arc). This is a phenomenon in which a local part at a fastening interface between members mainly made of a conductive material configuring the fastening part has an occurrence of an abrupt increase in temperature due to a current passing through the fastening part, and is molten to cause an electric discharge into the air. In many cases, a molten substance called hot particles is scattered from a molten portion. In general, since the inner space of the wing is used also as a fuel tank, an explosion prevention measure is required, in which ignition is prevented by suppressing the occurrence of an arc or sealing against an arc at the time of a hit by lightning, thereby preventing a discharge of the generated arc and hot particles scattered therefrom from being in contact with flammable fuel vapor. Here, examples of the portion having a possibility of being filled with flammable fuel vapor include the inside of a fuel tank, the inside of a surge tank (a tank where a vent scoop, a burst disk, and others are placed) generally placed on a wing end side of the fuel tank, and the inside of fuel-system equipment, in a portion inside the wing and a fuselage part.

Here, measures of suppressing the occurrence of an arc and sealing against the generated arc need to be considered for coupling interfaces between all portions of the fastener body and the fastening member and the wing-surface panel and the structural member in contact with these portions.

Among these, in a coupling interface between the fastening member and a structural member, a washer and a spacer made of an insulating material are conventionally interposed, thereby insulating the coupling interface between a bearing surface of the fastening member and a surface of the structural member. With this, the current at this portion is interrupted, and the effect of suppressing the occurrence of an arc is reinforced (for example, refer to Japanese Patent Application Laid-Open No. 2009-227166).

However, in the technology described in Japanese Patent Application Laid-Open No. 2009-227166, since the washer and and the spacer are interposed between the fastening member and the structural member, the technology has a problem such that a fastening force by the fastener member and the fastening member cannot be sufficiently achieved, providing poor feedback when the fastening member is mounted on the fastener member.

In other words, the problem described above is as follows. When the washer and the spacer are formed of an insulating material, a resin-based material is generally adopted. If the washer and the spacer are formed of a resin-based material, when the fastener member and the fastening member are fastened together, the washer and the spacer are deformed in their thickness direction. If the fastening force is increased, the washer and the spacer are crushed, and the fastening force cannot be sufficiently achieved.

Also, with the washer and the spacer being deformed at the time of fastening, tactile feedback when mounting the fastening member on the fastener member is impaired. This makes it difficult for a worker to ascertain to which degree the fastening member is screwed into, thereby impairing work stability.

Further, if the worker forgets to mount these washer and spacer, it is disadvantageously impossible to achieve an effect of reinforcing suppression of the occurrence of an arc by interrupting current with these washer and spacer.

Also, when a hole wall surface of a structural member is coated with an insulating coating and an insulating surface treatment is further performed on the fastener member, the fastener member or the fastening member and the structural member are not electrically connected. In such case, an electric field concentrates on an outer circumferential edge part of the fastening member, and insulation breakdown may occur between the outer circumferential edge part of the fastening member and the structural member to cause a spark.

SUMMARY OF THE INVENTION

The present invention was accomplished based on this technical problem, and has an object of providing a lightning-protective explosion-preventive fastener reliably achieving a fastening force by a fastener member and a fastening member while achieving a sufficient effect of suppressing the occurrence of an arc, the fastener also being excellent in work stability.

A lightning-protective explosion-preventive fastener of the present invention with such the object includes: a fastener body provided to fasten at least two members configuring an airframe of an aircraft, the fastener body penetrating through holes formed in all of the members; a fastening member mounted on a portion of the fastener body projecting from any of the members to fasten the members together; and an insulating cover covering a tip surface of the fastening member facing at least the member, wherein a step part is formed on each of an outer circumferential part and an inner circumferential part of the tip surface of the fastening member, and the insulating cover has a tip covering part covering the tip surface of the fastening member, an outer-circumferential-side cylindrical part rising from an outer circumferential part of the tip covering part in a direction orthogonal to the tip surface and fitting into the step part of the outer circumferential part of the tip surface, and an inner-circumferential-side cylindrical part rising from an inner circumferential part of the tip covering part in a direction orthogonal to the tip surface and fitting into the step part of the inner circumferential part of the tip surface.

With this, in the insulating cover, the thicknesses (dimensions rising from the tip covering part) of the outer-circumferential-side cylindrical part and the inner-circumferential-side cylindrical part are larger than the thickness of the tip covering part. On each of the outer circumferential side and the inner circumferential side of the fastening member, a distance from the member can be sufficiently ensured with the outer-circumferential-side cylindrical part and the inner-circumferential-side cylindrical part, thereby preventing a spark due to insulation breakdown and surface discharge occurring between the fastening member and the member.

Also, the tip coating part is thinner than the outer-circumferential-side cylindrical part and the inner-circumferential-side cylindrical part. Therefore, when the fastener body and the fastening member are fastened together, the amount of deformation of the tip covering part in a thickness direction can be made small, thereby ensuring a fastening strength between the fastener body and the fastening member and preventing an impairment of tactile feedback when the fastener body and the fastening member are fastened. With this, work stability becomes excellent.

Furthermore, a groove may be formed in the step part of the outer circumferential part of the fastening member, the groove being recessed toward an inner circumferential side, and an elongated projection may be formed in the outer-circumferential-side cylindrical part of the insulating cover, the elongated projection fitting into the groove.

With the groove and the elongated projection fitted to each other, the insulating cover can be prevented from being removed from the fastening member.

The insulating cover can be configured such that, with a tip part of the inner-circumferential-side cylindrical part and a tip part of the outer-circumferential-side cylindrical part each abutting on a bottom part of a relevant one of the step parts, an outer circumferential side and an inner circumferential side of each of the bottom surfaces are exposed.

Here, at least one of a gap between the inner-circumferential-side cylindrical part of the insulating cover and the fastener body and a gap between an outer circumferential side of the outer-circumferential-side cylindrical part and the member can be filled with a sealant.

Still further, the configuration can be such that an outer circumferential edge part of the fastening member projects to an outer circumferential side of the outer-circumferential-side cylindrical part fitted in the step part.

Still further, an outer circumferential edge part of the fastening member can be rounded.

Still further, the insulating cover can further include an outer-circumference covering part covering an outer circumferential surface of the fastening member and a top-surface covering part covering a top surface of the fastening member.

According to the present invention, it is possible to reliably achieve a fastening force by a fastener member and a fastening member while achieving a sufficient effect of suppressing the occurrence of an arc, the fastener also being excellent in work stability.

DETAILED DESCRIPTION OF THE PREFERRED EMBODIMENTS

The present invention is described in detail below based on embodiments shown in the attached drawings.

First Embodiment

Figure 1A:
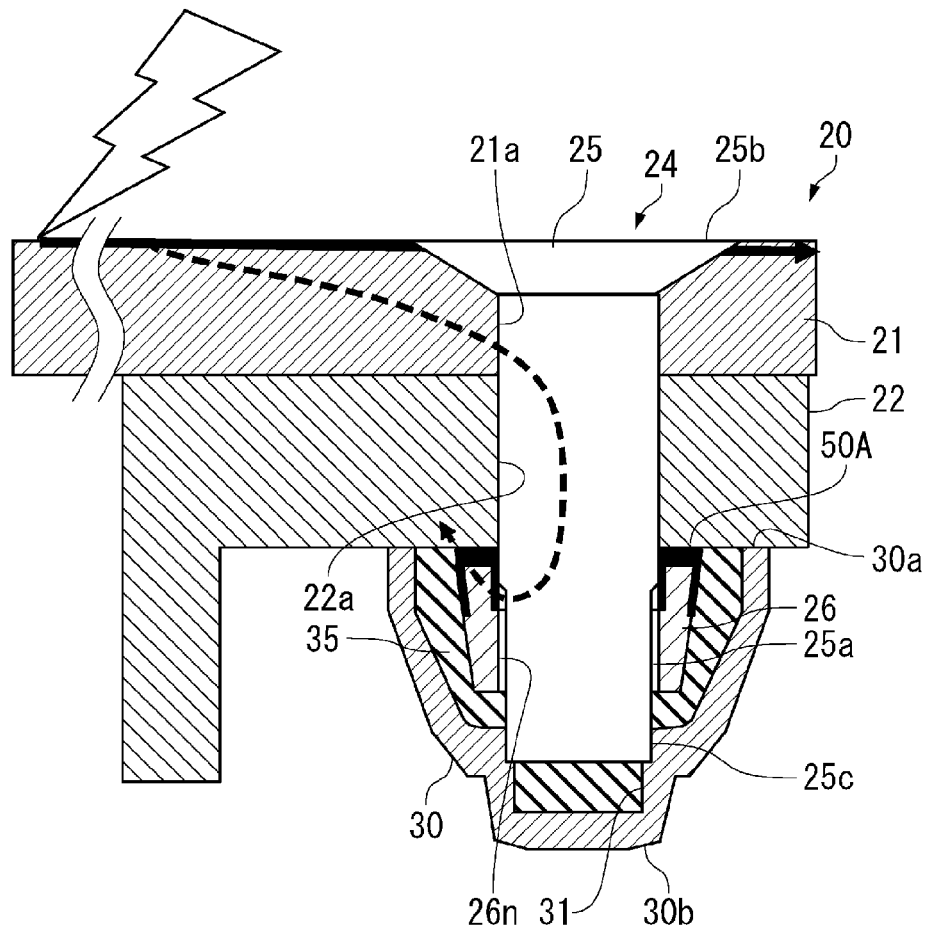
FIGS. 1A and 1B are views of a configuring of a lightning-protective explosion-preventive fastener in a first embodiment, FIG. 1A being a sectional view of a state in which members are fastened with the lightning-protective explosion-preventive fastener and FIG. 1B being a semi-sectional view of an insulating cover provided to a fastening member.

FIGS. 1A and 2A are partial sectional views of a wing configuring an airframe of an aircraft to which a lightning-protective explosion-preventive fastener in a first embodiment shown below described below is applied.

As shown in FIG. 1A, a wing (an aircraft assembly) 20 has a shell formed of a wing panel (member) 21 made of, for example, a metal material such as aluminum alloy, CFRP (Carbon Fiber Reinforced Plastics), which is a composite material made of a carbon fiber and a resin, or GFRP (Glass Fiber Reinforced Plastics), which is a composite material made of a glass fiber and a resin. A structural member for reinforcement (such as a rib), a fuel tank and various devices provided inside of the wing 20 are fixed to the wing panel 21 via a member 22 such as a stay made of a metal material such as an aluminum alloy or a composite material. The member 22 such as a stay is mounted on the wing panel 21 by a lightning-protective explosion-preventive fastener 24.

Although not shown in the drawings, when the wing panel 21 is made of a composite material, the wing panel 21 often has a metal foil or a metal mesh affixed on a surface side of a portion where there is a high possibility of a direct hit by lightning. Also, whichever material, a metal or a composite material, the wing panel 21 is made of, a primer and a coating are often applied onto an outer surface of the wing panel 21 for an anti-corrosive purpose or the like. Onto other surfaces of the wing panel 21 and its inner structural members other than a portion requiring electric conductance, a primer is often applied.

The lightning-protective explosion-preventive fastener 24 includes a pin-shaped fastener body 25 and a fastening member 26 mounted on the fastener body 25 on an inner side of the wing 20.

The fastener body 25 and the fastening member 26 are generally made of a metal material (for example, titanium, stainless steel, or aluminum) in view of strength.

The pin-shaped fastener body 25 has a screw thread 25a formed at its tip, and has a head 25b at its rear end, the head 25b having a diameter expanded from the tip. This fastener body 25 is inserted from outside of the wing 20 into holes 21a and 22a formed as penetrating through the wing panel 21 and the member 22, and has its tip project toward inside the wing 20, with the head 25b at the rear end abutting on a circumferential surface of the hole 21a.

Surface treatment for the fastener body 25 is selected depending on the portion to be used and the working method, and a treatment for solid metal materials, an insulating coating treatment using alumina or the like, a conductive treatment using ion vapor deposition, or other such treatment can be used therefore.

The fastening member 26 is in the shape of a cylinder, and has an inner circumferential surface formed with a screw thread 26n engaging with the screw thread 25a of the fastener body 25. This fastening member 26 is screwed into the screw thread 25a of the fastener body 25 projecting toward the inside of the wing 20. With this, the wing panel 21 and the member 22 are interposed between the head 25b of the fastener body 25 and the fastening member 26, thereby causing the member 22 to be fixed to the wing panel 21. Here, the fastening member 26 is preferably of a self-locking type capable of preventing looseness after being screwed into the fastener body 25. Also, the fastening member 26 may be of a torque-off type configured so that a nut-shaped head having a hexagonal shape or the like is cut out when reaching a predetermined torque. Alternatively, it may be a removable fastening member of a double-hex type or the like when the fastening member is used for coupling in order to mount a device and is required to be attached or removed for maintenance or the like.

Note that, in this state, a tip 25c of a shank part of the fastener body 25 projects to the inner circumferential side of the wing 20 from the fastening member 26 and, furthermore, causes the screw thread 25a to be exposed to the inner circumferential side of the wing 20 from the fastening member 26.

Meanwhile, on an inner space side of the wing 20, a cap 30 is mounted on the fastener body 25.

The cap 30 is in the shape of a circle in section, is open on one end 30a side, and has a shape with its inner diameter and outer diameter gradually decreasing toward another end 30b side. This cap 30 is preferably formed of a resin having insulation properties, such as poly(phenylene sulfide) (PPS), polyimide, polyether ether ketone (PEEK), or a nylon resin.

On an inner circumferential surface of the cap 30 on the other end 30b side, a closed-end screw hole 31 in the shape of a circle in section is formed. With the one end 30a being pressed onto the member 22, the tip 25c of the fastener body 25 is screwed into the screw hole 31, thereby allowing the cap 30 to be easily and reliably positioned and fixed to the fastener body 25.

With the cap 30 being mounted on the fastener body 25, the inside of the cap 30 is filled with a sealant agent 35 having insulation properties. With this sealant agent 35 being interposed between the inner circumferential surface of the cap 30 and the fastener body 25 and the fastening member 26, the sealing effect against an arc occurring between the fastener body 25 and the member 22, between the fastener body 25 and the fastening member 26, and between the fastening member 26 and the member 22 is increased.

Figure 1B:
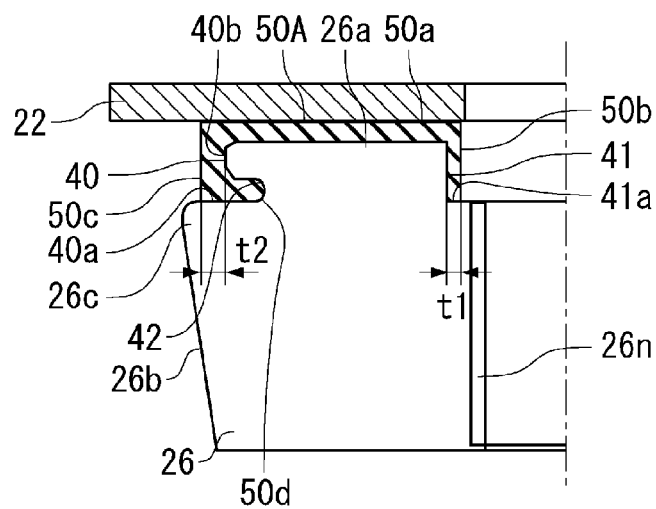

As shown in FIG. 1B, in the fastening member 26, step parts 40 and 41 are formed on an outer circumferential part and an inner circumferential part of a tip surface 26a facing the member 22, the step parts 40 and 41 being continuous in a circumferential direction and being recessed with respect to the tip surface 26a. The step parts 40 and 41 have bottom surfaces 40a and 41a formed each in parallel to the tip surface 26a.

Also, in the step part 40, a groove 42 is formed on a side surface 40b rising on an inner circumferential side of the bottom surface 40a in a direction orthogonal to the bottom surface 40a, the groove 42 being continuous in a circumferential direction and being recessed in a radial direction.

An outer circumferential edge part 26c of the fastening member 26 formed of an outer circumferential surface 26b of the fastening member 26 and the bottom surface 40a of the step part 40 is rounded with a predetermined radius of curvature. With this, a discharge spark due to electric field concentration between the outer circumferential edge part 26c of the fastening member 26 and the member 22 can be prevented, thereby improving the lightning protection capability of the fastening member 26.

At a tip part of this fastening member 26, an insulating cover 50A made of an insulating material such as a resin-based material is provided. As an insulating material for forming the insulating cover 50, a resin or the like is preferably used, such as thermosetting polyimide resin, PEEK (polyether ether ketone resin, and PEEK is a registered trademark of Victrex plc (Great Britain)), PPS (poly(phenylene sulfide) resin), nylon resin, and others.

The insulating cover 50A covers the tip surface 26a of the fastening member 26, and has a tip covering part 50a covering the tip surface 26a of the fastening member 26 and abutting on the member 22, an inner-circumferential-side cylindrical part 50b rising on an inner circumferential side of the tip covering part 50a in a direction orthogonal to the tip covering part 50a and fitting into the step part 41, an outer-circumferential-side cylindrical part 50c rising on an outer circumferential side of the tip covering part 50a in a direction orthogonal to the tip covering part 50a and fitting into the step part 40, an annular elongated projection 50d projecting from the tip part of the outer-circumferential-side cylindrical part 50c to an inner circumferential side to be fitted in the groove 42.

The inner-circumferential-side cylindrical part 50b and the outer-circumferential-side cylindrical part 50c have thicknesses t1 and t2 smaller than widths of the step parts 40 and 41. With tip parts of the inner-circumferential-side cylindrical part 50b and the outer-circumferential-side cylindrical part 50c abutting on the bottom surfaces 40a and 41a, an outer circumferential side of the bottom surface 40a and an inner circumferential side of the bottom surface 41a are exposed.

The fastening member 26 including this insulating cover 50A is produced in the following manner.

Figure 2:
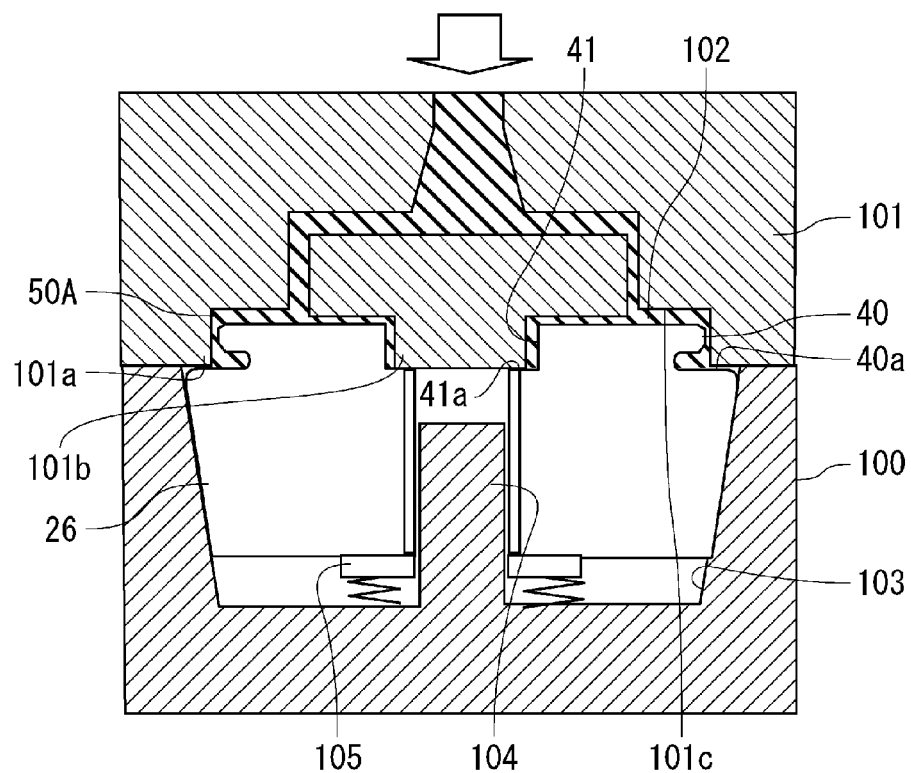
FIG. 2 is a view of an example of a mold for forming the insulating cover shown in FIG. 1B.

That is, as shown in FIG. 2, the fastening member 26 is set in molds 100 and 101. Here, the fastening member 26 is accommodated in a recessed part 103 formed in the mold 100, and is inserted in a shank 104 standing up from a bottom surface of the recessed part 103. Also, the bottom surface of the recessed part 103 is provided with a pressing member 105 formed of a spring or the like pressing the fastening member 26 to a mold 101 side.

When the molds 100 and 101 are closed, the fastening member 26 is pressed by the pressing member 105 onto the mold 101 so as to cause tip surfaces 101a and 101b of the mold 101 to abut on the outer circumferential side of the bottom surface 40a and the inner circumferential side of the bottom surface 41a of the step parts 40 and 41 of the fastening member 26.

With a cavity 102 formed between the fastening member 26 and a mold surface 101c of the mold 101 being filled with resin, the insulating cover 50A can be integrally formed at the tip part of the fastening member 26.

According to the configuration as described above, since the tip part of the fastening member 26 is covered with the insulating cover 50A, insulation at a coupling interface between the fastening member 26 and the member 22 can be achieved, thereby suppressing the occurrence of an arc at this portion. Also, since the insulating cover 50A is integrally formed on the fastening member 26, the insulating cover 50A is never forgotten to be mounted, as a matter of course, thereby reliably achieving the effect of reinforcing suppression of the occurrence of an arc. Furthermore, works of mounting a washer or a space can also be saved, thereby increasing work efficiency. In addition, a surface treatment or coating with an insulating material can also be omitted and, thus also in this perspective, an improvement in work efficiency and a reduction in cost can be achieved.

Still further, in the insulating cover 50a, the inner-circumferential-side cylindrical part 50b and the outer-circumferential-side cylindrical part 50c fitting in the step parts 40 and 41 each have a large dimension (a thickness) in an axial direction of the fastener body 25 with respect to the tip covering part 50a covering the tip surface 26a of the fastening member 26. With this, in an outer circumferential side and an inner circumferential side of the fastening member 26, a distance from the member 22 can be sufficiently ensured by the outer-circumferential-side cylindrical part 50c and the inner-circumferential-side cylindrical part 50b. Therefore, insulation breakdown between the fastening member 26 and the member 22 and surface discharge occurring across an insulating layer can be suppressed. Explosion of the fuel tank caused by a spark occurring due to insulation breakdown or surface discharge that can occur between the step parts 40 and 41 of the fastening member 26 and the member 22 can be prevented.

On the other hand, the tip covering part 50a is thinner than the outer-circumferential-side cylindrical part 50c and the inner-circumferential-side cylindrical part 50b. Therefore, when the fastener body 25 and the fastening member 26 are fastened together, the amount of deformation of the tip covering part 50a in a thickness direction can be made small, thereby ensuring a fastening strength between the fastener body 25 and the fastening member 26 and preventing an impairment of tactile feedback when the fastener body 25 and the fastening member 26 are fastened. As a result, work stability becomes excellent.

Still further, the configuration is such that the groove 42 is formed on the step part 40 of the fastening member 26 and the elongated projection 50d of the insulating cover 50A is fitted in this groove 42. Therefore, the insulating cover 50A can be prevented from inadvertently falling off from the fastener member 50A. With this, the handling of the fastener member 26 during working can be facilitated.

With the tip parts of the inner-circumferential-side cylindrical part 50b and the outer-circumferential-side cylindrical part 50c abutting on the bottom surfaces 40a and 41b, the outer circumferential side of the bottom surface 40a and the inner circumferential side of the bottom surface 41a are exposed. With this, when the insulating cover 50A is integrally molded with the fastening member 26 as shown in FIG. 2, the tip surfaces 101a and 101b of the mold 101 abut on the outer circumferential side of the bottom surface 40a of the step part 40 and the inner circumferential side of the bottom surface 41 of the step part 41 of the fastening member 26. As a result, it is possible at the time of forming the insulating cover 50A to prevent the insulating material forming the insulating cover 50A from flowing into the screw thread 26n of the fastening member 26 and the outer circumferential surface 26b.

Still further, since the configuration is such that the insulating cover 50A does not project from the fastening member 26 to an outer circumferential side, it is possible to prevent the insulating cover 50A from inadvertently colliding with a thing or being removed by a worker catching the insulating cover 50A with his or her clothes.

Still further, with the tip parts of the outer-circumferential-side cylindrical part 50b and the inner-circumferential-side cylindrical part 50c abutting on the bottom surfaces 40a and 41a, the outer circumferential side of the bottom surface 40a and the inner circumferential side of the bottom surface 41a are exposed. With this, a gap between the inner circumferential surface of the inner-circumferential-side cylindrical part 50b and the fastener body 25 and on an outer circumferential side of the outer-circumferential-side cylindrical part 50c can be each filled with a sealant. This enables sealing against an arc occurring at the coupling interface between the fastener body 25 and the through holes 21 and 22, thereby further improving lightning protection capability.

Still further, since the outer circumferential edge part 26c of the fastening member 26 is rounded with a predetermined radius of curvature, electric field concentration on the outer circumferential edge part 26c can be prevented, and the occurrence of an arc between the outer circumferential edge part 26c and the member 22 can be prevented.

Second Embodiment

Next, a second embodiment of the present invention is described.

In the following, the configuration of the insulating cover 50A is different from that of the first embodiment described above, and other configurations are common to those of the first embodiment described above. Therefore, in the following, description is made mainly on the configurations different from those of the first embodiment described above, and the configurations common to the first embodiment are provided with the same reference numerals and their description is omitted.

Figure 3A:
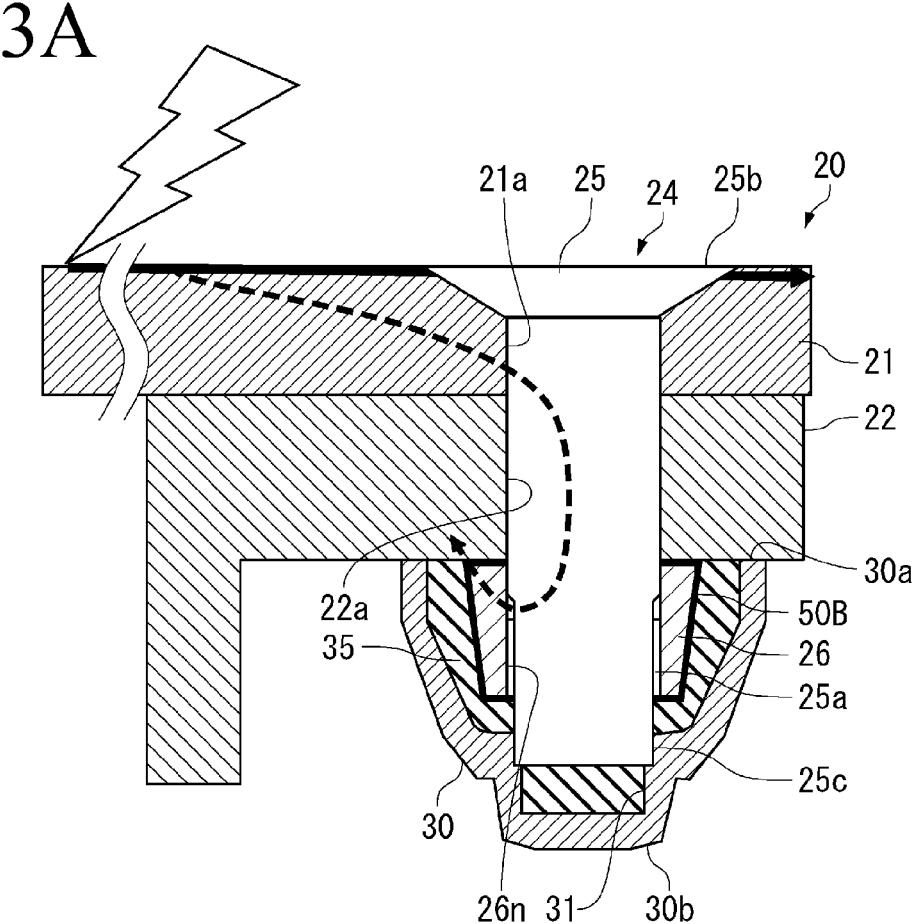
FIGS. 3A and 3B are views of the configuration of a lightning-protective explosion-preventive fastener in a second embodiment, FIG. 3A being a sectional view of a state in which members are fastened with the lightning-protective explosion-preventive fastener and FIG. 3B being a semi-sectional view of an insulating cover provided to a fastening member.
Figure 3B:
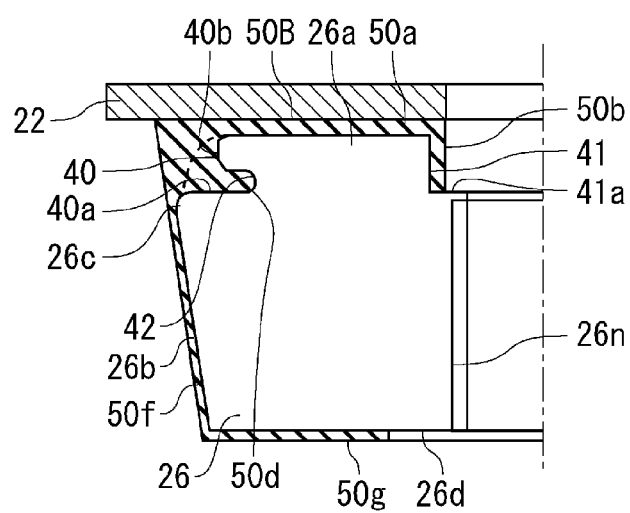

As shown in FIG. 3, an insulating cover 50B in the present embodiment includes the tip covering part 50a covering the tip surface 26a of the fastening member 26 and abutting on the member 22, the inner-circumferential-side cylindrical part 50b rising on an inner circumferential side of the tip covering part 50a in a direction orthogonal to the tip covering part 50a and fitting in the step part 41, and an outer-circumference covering part 50f rising on an outer circumferential side of the tip covering part 50a in a direction orthogonal to the tip covering part 50a, fitting in the step part 40, and covering the outer circumferential surface 26b of the fastening member 26, and a top-surface covering part 50g covering a top surface 26d of the fastening member 26.

Here, while the annular elongated projection 50d fitting in the groove 42 formed in the fastening member 26 can be further provided, the configuration can be without the groove 42 in the present embodiment. In this case, as indicated by a two-dot chain line in FIG. 3B, the outer circumferential edge part 26c of the fastening member 26 can be rounded with a large radius of curvature so as to be continuous to the tip surface 26a of the fastening member 26. With this, electric field concentration on the outer circumferential edge part 26c can be prevented, and a spark due to insulation breakdown and surface discharge between the outer circumferential edge part 26c and the member 22 can be prevented from occurring.

Figure 4:
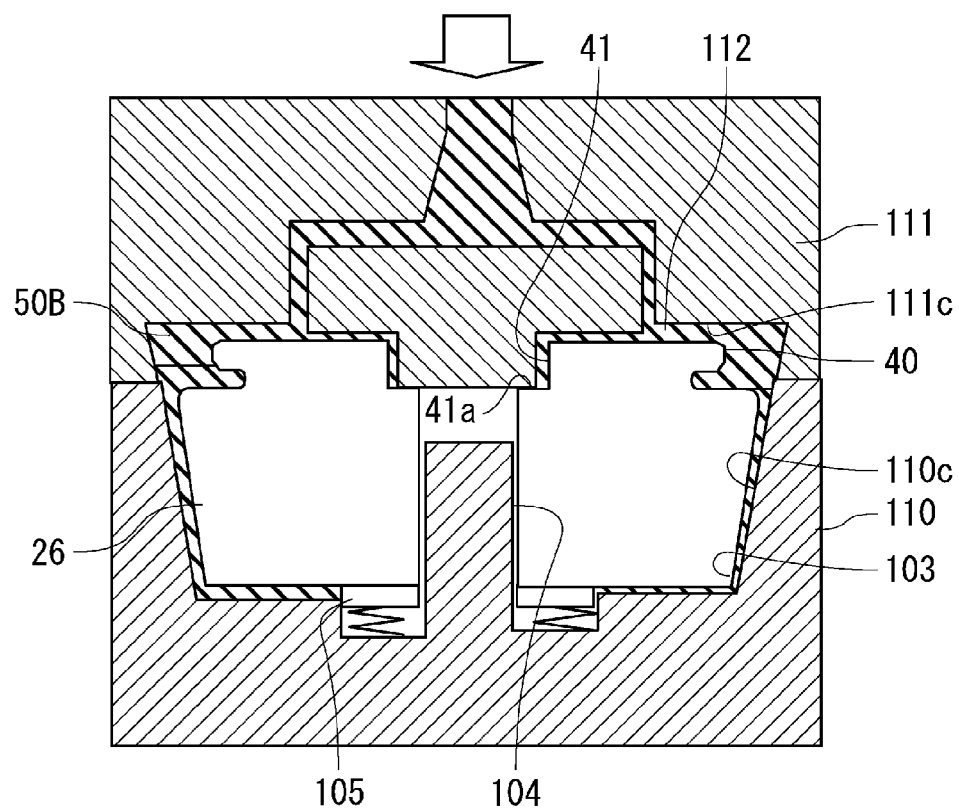
FIG. 4 is a view of an example of a mold for forming the insulating cover shown in FIG. 3B.

This insulating cover 50B, as shown in FIG. 4, can be integrally molded with the fastening member 26 with the molds 110 and 111 approximately similar to those shown in FIG. 2. Here, the fastening member 26 is inserted in the shank 104 of the recessed part 103 formed on the mold 110, and is supported as being pressed upward by the pressing member 105.

When the molds 110 and 110 are closed, the fastening member 26 is pressed onto the mold 111 by the pressing member 105. In this state, a cavity 112 formed between a mold surface 110c of the mold 110 and a mold surface 111c of the mold 111 is filled with resin, thereby integrally molding the insulating cover 50B on the fastening member 26.

According to the configuration described above, functions and effects similar to those described in the first embodiment can be obtained. In addition, by covering the outer circumferential surface 26b and the top surface 26b of the fastening member 26 are covered with the outer-circumference covering part 50f and the top-surface covering part 50g, the insulating cover 50B can be prevented from falling off from the fastening member 26.

Also, with this, the configuration can be without the groove 42, processing of the fastening member 26 can be facilitated.

Note that while the lightning-protective explosion-preventive fastener for use in the wing 20 has been mainly described in the embodiments described above, the present invention can achieve similar effects for a lightning-protective explosion-preventive fastener for explosion prevention for use in another portion, such as a fuselage of an aircraft.

Also, the shape of each part of the fastening member 26 and the shape of each part of the insulating covers 50A ad 50B can be changed as appropriate within a scope of the gist of the present invention. Also, the configurations other than the fastening member 26 and the insulating covers 50A and 50B are not intended to be restricted at all, and can take another configuration as appropriate.

Other than this, the configurations cited in the above described embodiments can be selected or omitted, or can be arbitrarily changed to the other configurations, without departing from the gist of the present invention.

What is claimed is:

1. A lightning-protective explosion-preventive fastener comprising:
    a fastener body provided to fasten at least two members configuring an airframe of an aircraft, the fastener body penetrating through holes formed in all of the members;
    a fastening member mounted on a portion of the fastener body projecting from any of the members to fasten the members together; and
    an insulating cover covering a tip surface of the fastening member facing at least the member, wherein
    a step part is formed on each of an outer circumferential part and an inner circumferential part of the tip surface of the fastening member, and
    the insulating cover has a tip covering part covering the tip surface of the fastening member, an outer-circumferential-side cylindrical part rising from an outer circumferential part of the tip covering part in a direction orthogonal to the tip surface and fitting into the step part of the outer circumferential part of the tip surface, and an inner-circumferential-side cylindrical part rising from an inner circumferential part of the tip covering part in a direction orthogonal to the tip surface and fitting into the step part of the inner circumferential part of the tip surface.

2. The lightning-protective explosion-preventive fastener according to claim 1, wherein
    a groove is formed in the step part of the outer circumferential part of the fastening member, the groove being recessed toward an inner circumferential side, and
    an elongated projection is formed in the outer-circumferential-side cylindrical part of the insulating cover, the elongated projection fitting into the groove.

3. The lightning-protective explosion-preventive fastener according to claim 2, wherein
    in the insulating cover, with a tip part of the inner-circumferential-side cylindrical part and a tip part of the outer-circumferential-side cylindrical part each abutting on a bottom part of a relevant one of the step parts, an outer circumferential side and an inner circumferential side of each of the bottom surfaces are exposed.

4. The lightning-protective explosion-preventive fastener according to claim 3, wherein
    an outer circumferential edge part of the fastening member projects to an outer circumferential side of the outer-circumferential-side cylindrical part fitted in the step part.

5. The lightning-protective explosion-preventive fastener according to claim 3 or 4, wherein
    at least one of a gap between the inner-circumferential-side cylindrical part of the insulating cover and the fastener body and a gap between an outer circumferential side of the outer-circumferential-side cylindrical part and the member is filled with a sealant.

6. The lightning-protective explosion-preventive fastener according to claim 1, wherein
    an outer circumferential edge part of the fastening member is rounded.

7. The lightning-protective explosion-preventive fastener according to claim 1, wherein
    the insulating cover further includes an outer-circumference covering part covering an outer circumferential surface of the fastening member and a top-surface covering part covering a top surface of the fastening member.

* * * * *